United States Patent [19]

Fujimoto

[11] Patent Number: 4,748,623
[45] Date of Patent: May 31, 1988

[54] FRAME SYNCHRONIZING CIRCUIT

[75] Inventor: Naonobu Fujimoto, Yokohama, Japan

[73] Assignee: Fujitsu Limited, Kawasaki, Japan

[21] Appl. No.: 60,488

[22] Filed: Jun. 11, 1987

[30] Foreign Application Priority Data

Jun. 18, 1986 [JP] Japan .................................. 61-142511

[51] Int. Cl.$^4$ .............................................. H04L 1/02
[52] U.S. Cl. .................................... 370/100; 370/105; 375/114; 375/116
[58] Field of Search ............... 375/106, 111, 114, 116; 370/100, 105, 106, 108; 371/42, 49

[56] References Cited

U.S. PATENT DOCUMENTS

| | | | |
|---|---|---|---|
| 3,550,082 | 12/1970 | Tong | 375/114 |
| 3,678,200 | 7/1972 | Clark | 375/114 |
| 4,414,676 | 11/1983 | Kraul et al. | 375/116 |
| 4,453,260 | 6/1984 | Inagawa et al. | 370/105 |
| 4,472,811 | 9/1984 | Froggatt | 370/105 |
| 4,633,486 | 12/1986 | Berlekamp et al. | 375/116 |
| 4,646,328 | 2/1987 | Riou | 375/116 |

Primary Examiner—Robert L. Griffin
Assistant Examiner—Stephen Chin
Attorney, Agent, or Firm—Staas & Halsey

[57] ABSTRACT

A frame synchronizing circuit uses parallel processing of a received multiplexed signal to detect frame synchronization. The input signal is separated into a predetermined number of signal trains. A matching number of frame synchronizing pattern detection circuits detect the presence of the frame synchronizing pattern by each of the frame synchronizing pattern detection circuits detecting the presence of a modified frame synchronizing pattern. The modified frame synchronizing patterns all contain the same sequence of bits, but the leading bit of the frame synchronizing pattern is in a different signal train in each of the modified frame synchronizing patterns. Timing comparison circuits corresponding to the modified frame synchronizing pattern detection circuits indicate which, if any, of the modified frame synchronizing patterns, are in coincidence with a frame pulse generated at the time the frame synchronizing pattern is expected to be detected. Synchronization guarding circuits corresponding to the timing comparison circuits indicate which, if any, of the modified frame synchronizing patterns is in synchronization with the frame pulse. A timing control circuit adjusts the timing of the frame pulse when the timing comparsion and synchronization guarding circuits indicate noncoincidence and asynchronization of all of the modified frame synchronizing patterns.

7 Claims, 15 Drawing Sheets

FIG. 2A

| a | b | c | d | e | f | g | h | i | j | k | l |
|---|---|---|---|---|---|---|---|---|---|---|---|
| 1 | 1 | 1 | 1 | 0 | 1 | 0 | 0 | 0 | 0 | 0 | 0 |

FIG. 2B

| a | c | e | g | i | k |   |
|---|---|---|---|---|---|---|
| 1 | 1 | 1 | 1 | 0 | 0 | DATA 1 |

| b | d | f | h | j | l |   |
|---|---|---|---|---|---|---|
| 1 | 1 | 0 | 0 | 0 | 0 | DATA 2 |

FIG. 2C

|   | b | d | f | h | j | l |   |
|---|---|---|---|---|---|---|---|
| X | 1 | 1 | 0 | 0 | 0 | 0 | DATA 1 |

| a | c | e | g | i | k |   |   |
|---|---|---|---|---|---|---|---|
| 1 | 1 | 1 | 1 | 0 | 0 | X | DATA 2 |

FIG. 2D

| a | e | i |   |
|---|---|---|---|
| 1 | 1 | 0 | DATA 1 |

| b | f | j |   |
|---|---|---|---|
| 1 | 0 | 0 | DATA 2 |

| c | g | k |   |
|---|---|---|---|
| 1 | 1 | 0 | DATA 3 |

| d | h | l |   |
|---|---|---|---|
| 1 | 0 | 0 | DATA 4 |

FIG. 2E

|   | d | h | l |   |
|---|---|---|---|---|
| X | 1 | 0 | 0 | DATA 1 |

| a | e | i |   |   |
|---|---|---|---|---|
| 1 | 1 | 0 | X | DATA 2 |

| b | f | j |   |   |
|---|---|---|---|---|
| 1 | 0 | 0 | X | DATA 3 |

| c | g | k |   |   |
|---|---|---|---|---|
| 1 | 1 | 0 | X | DATA 4 |

FIG. 2F

|   | c | g | k |   |
|---|---|---|---|---|
| X | 1 | 1 | 0 | DATA 1 |

|   | d | h | l |   |
|---|---|---|---|---|
| X | 1 | 0 | 0 | DATA 2 |

| a | e | i |   |   |
|---|---|---|---|---|
| 1 | 1 | 0 | X | DATA 3 |

| b | f | j |   |   |
|---|---|---|---|---|
| 1 | 0 | 0 | X | DATA 4 |

FIG. 2G

|   | b | f | j |   |
|---|---|---|---|---|
| X | 1 | 0 | 0 | DATA 1 |

|   | c | g | k |   |
|---|---|---|---|---|
| X | 1 | 1 | 0 | DATA 2 |

|   | d | h | l |   |
|---|---|---|---|---|
| X | 1 | 0 | 0 | DATA 3 |

| a | e | i |   |   |
|---|---|---|---|---|
| 1 | 1 | 0 | X | DATA 4 |

FRAME SYNCHRONIZING CIRCUIT

BACKGROUND OF THE INVENTION

1. Field of the Invention

The present invention relates to a frame synchronizing circuit for discriminating the time slot location of each channel of a time-division multiplex signal and, more particularly, a frame synchronizing circuit which processes a time-division multiplexed signal in parallel.

2. Description of the Related Art

In time-division multiplexing, the signals (pulses) of respective channels to be multiplexed are allocated continuously to time slots, one after another, and pulses forming a frame synchronizing pattern are inserted periodically. The period for inserting the frame synchronizing pattern is called a frame. On the receiving side, a received pulse train is checked once each frame and the time slot location of each channel is discriminated by detecting the frame synchronizing pattern. This is called frame synchronization.

Frame synchronization is generally required to satisfy the following important factors.

(1) Synchronization should be established as quickly as possible (high speed recovery from asynchronization);

(2) Once synchronization is established, misframing, caused by a momentary change of the frame synchronizing pattern due to code or transmission error which is interpreted as asynchronization, should be minimized (forward guard); and (3) Asynchronization should not be interpreted as synchronization (backward guard).

One frame synchronization recovery method is the one bit shift method. In this method, the frame counter in the receiving side is stopped for one bit for each detection of noncoincidence of the frame synchronizing pattern and synchronization recovery is carried out by shifting bit by bit the relative phase of the frame pulse in the input signal and the frame pulse generated in the receiving side.

The one-bit immediate shift method has also been proposed. In this method, when noncoincidence of the frame synchronizing pattern is detected, the counter system of the synchronizing circuit is immediately stopped for one time slot to shift one-bit and simultaneously "next detection" is carried out.

A synchronization guarding circuit is typically included in the frame synchronizing circuit to reduce the risk of generating a misframe due to code error (the forward guarding function). However, such synchronization guarding circuit increases the detecting time for actual asynchronization. Meanwhile, the backward guarding function reduces the likelihood of mistaking asynchronization for synchronization, but increases the possibility of rejecting synchronization. Thus, design of a synchronization guarding circuit requires the trade off of contradictory factors.

A conventional one-bit immediate shift type frame synchronizing circuit, which performs frame synchronization recovery processing, has a limitation in that the one-bit immediate shift is impossible if loop delay is not suppressed within one time slot. Therefore, if the number of multiplexed channels is increased, such as in an optical communication system, high speed signal processing is required because the signal bit rate rises as high as 405 Mbps, 565 Mbps or 810 Mbps. At this rate, it is impossible for an ordinary device to perform frame synchronization.

In addition, it is desirable to use a complementary metal oxide semiconductor integrated circuits (CMOS-ICs) because CMOS-ICs consume less power. However, CMOS-ICs have an operation rate limit of about 30 Mbps and therefore cannot be employed for a multiplexed signal of about 45 Mbps which is standard in North America. As a result, a transistor-transistor logic integrated circuit (TTL-IC) which consumes a relatively large amount of power is used instead of a CMOS-IC.

Due to the above-described problems, recently a parallel frame synchronizing circuit has been proposed where the bit rate is reduced by one-half. In such a circuit, the frequency of the high order group digital multiplexed signal is separated into two signal trains. In such a parallel frame synchronizing circuit, it is possible to suppress loop delay in the circuit within one time slot because the bit rate is reduced. However, since the frame synchronizing pattern is separated into two partial patterns, the bit length of the frame synchronization pattern is reduced by one-half. In general, when the bit length of the frame synchronizing pattern is shortened, the number of forward protection stages and backward protection stages of the synchronization guarding circuit must be increased and the resultant time required for synchronization recovery becomes longer. Accordingly, where a frame synchronization pattern with the same length as the ordinary pattern is used in such a parallel frame synchronizing circuit, there is a disadvantage in that the synchronization recovery time is longer than in an ordinary frame synchronizing circuit.

SUMMARY OF THE INVENTION

An object of the present invention is to perform frame synchronization with a short synchronization recovery time using a parallel frame synchronizing circuit without changing the frame synchronizing pattern.

Another object of the present invention is to use a synchronization guarding circuit with few stages in a parallel frame synchronizing circuit.

The above objects are attained by providing a frame synchronizing circuit, comprising signal separation means for separating a multiplexed input signal, having a frame synchronizing pattern periodically inserted therein, into a predetermined number of signal trains; frame synchronizing pattern detection means for detecting modified frame synchronizing patterns in the signal trains; frame pulse output means for outputting a frame pulse with a timing corresponding to the period of the frame synchronizing pattern in the multiplexed input signal; timing comparison means for producing a noncoincidence signal indicating noncoincidence of the frame pulse and each of the modified frame synchronizing patterns; synchronization guarding means for discriminating whether the frame pulse is synchronized with one of the modified frame synchronizing patterns; and timing control means for adjusting the timing of the frame pulse when the timing comparison means detects noncoincidence of all of the modified frame synchronizing patterns and when the synchronization guarding circuit indicates asynchronization.

The above objects, together with other objects and advantages which will be subsequently apparent, reside in the details of the construction and operation as more

BRIEF DESCRIPTION OF THE DRAWINGS

FIGS. 2A-2G are pictorial representations of transmitted and modified frame synchronizing patterns;

DESCRIPTION OF THE PREFERRED EMBODIMENTS

Figure 1:
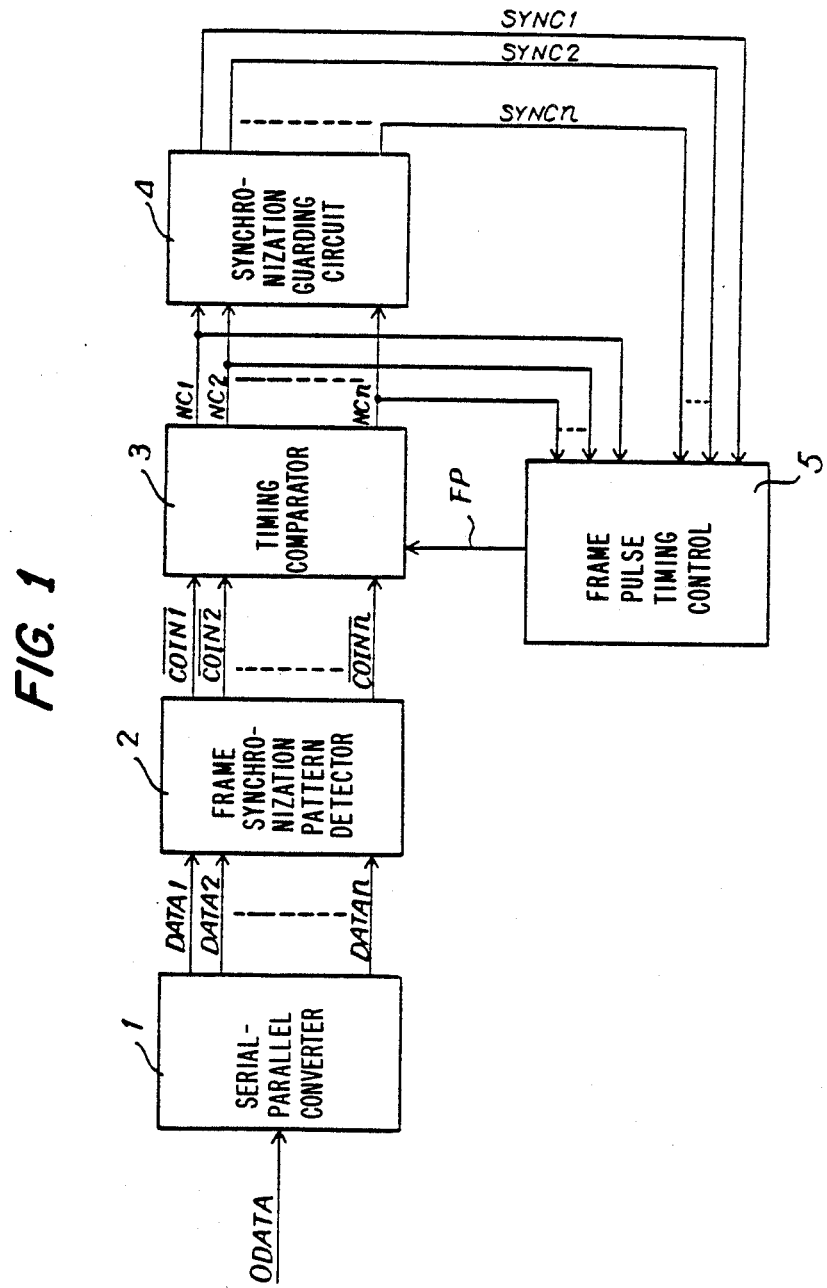
FIG. 1 is a block diagram illustrating the principle structure of a frame synchronizing circuit according to the present invention.

FIG. 1 is a block diagram illustrating the principle structure of a frame synchronizing circuit according to the present invention. In FIG. 1, a signal separation circuit 1 separates a high order digital multiplexed input signal ODATA into a predetermined number (n) of signal trains (DATA1 to DATAn) using series-to-parallel conversion. The high order digital signal ODATA is obtained by multiplexing of a frame synchronizing pattern and a plurality of channels of digital signals. A frame synchronization pattern detection circuit (FSP detector) 2 detects n modified frame synchronizing pattern which result from dividing the frame synchronizing pattern in the signal separation circuit 1 when the high order group digital signal ODATA is divided. The FSP detector 2 outputs pattern not detected signal $\overline{COIN1}$ to $\overline{COIN2}$ detection of each modified frame synchronizing pattern. A frame pulse timing control circuit 5 outputs a frame pulse signal FP with a timing corresponding to the frame synchronizing pattern period. A timing comparison circuit 3 compares the timing of the frame pulse signal FP and the timing of the pattern not detected signals to $\overline{COIN1}$ to $\overline{COINn}$ from the FSP detector 2. A synchronization guarding circuit 4 determines whether synchronization is established based upon noncoincidence signals NC1 to NCn output from the timing comparison circuit 3. The frame pulse timing control circuit 5 adjusts the phase of frame pulse signal FP when all the outputs of the synchronization guarding circuit 4 indicate asynchronization and all of the noncoincidence signals from the timing comparison circuit 3 indicate noncoincidence.

Next, of the frame synchronizing pattern into partial patterns by the series-parallel conversion circuit 1 will be explained with reference to FIGS. 2A-2G. FIG. 2A illustrates an example of a 12-bit frame synchronizing pattern and FIGS. 2B and 2C illustrate separation of the frame synchronizing pattern into two signals, DATA1 and DATA2, by the series-parallel conversion circuit 1. When the leading bit a of the frame synchronizing pattern is put into DATA1 (MODE1), the modified frame synchronizing pattern which results is illustrated in FIG. 2B, while when the leading bit a is put into DATA2 (MODE2), the result is as indicated in FIG. 2C. Thus, two different modified frame synchronizing patterns can result when the multiplexed input signal is separated into two signal trains DATA1 and DATA2.

FIGS. 2D-2G illustrate the modified frame synchronization patterns which can result when the multiplexed input signal is separated into four signal trains, DATA1 to DATA4, by the series-parallel conversion circuit 1. In this case, four different modified frame synchronizing patterns appear in the signal trains DATA1 to DATA4. In FIGS. 2C and 2E-2G, the "X" symbols indicate bits not included in the frame synchronizing pattern. A plurality of modified frame synchronizing patterns appear in accordance with the number of signal trains formed from ODATA because the series-parallel conversion circuit 1 sequentially outputs DATA1, DATA2, DATA3, ..., DATAn in parallel, bit by bit in accordance with the input sequence of ODATA. As is apparent from FIGS. 2B-2G, the number of signal trains into which ODATA is separated by the series-parallel conversion circuit 1 corresponds to the number of modified frame synchronizing patterns to be detected.

Figure 3:
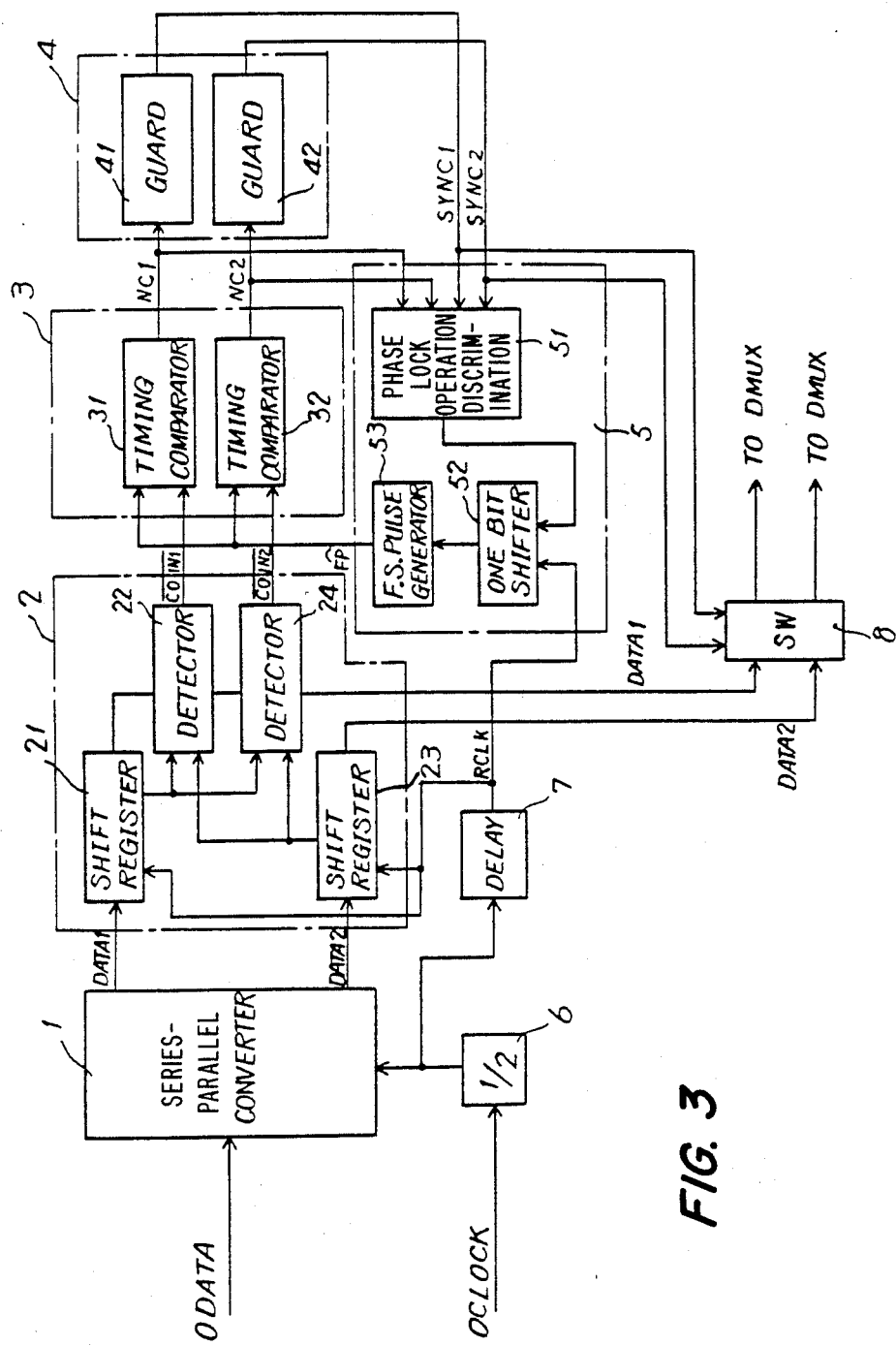
FIG. 3 is a block diagram of a parallel frame synchronizing circuit according to the present invention in which the input signal is separated into two signal trains.

FIG. 3 is a block diagram of a frame synchronizing circuit according to the present invention in which the multiplexed input signal ODATA is separated into two signal trains. The series-parallel conversion circuit 1 separates ODATA into DATA1 and DATA2 on the basis of a clock signal OCLOCK. The clock signal OCLOCK is extracted from ODATA and divided by ½ in a frequency dividing circuit 6. Each of the resulting signal trains DATA1 and DATA2 has a bit rate that is one-half that of ODATA, and is input to the FSP detector 2. Signal train DATA1 is input to shift register 21, while signal train DATA2 is input to shift register 23. A delay circuit 7 adjusts the phase of the clock signal from the frequency dividing circuit 6 to match the delay of DATA1 and DATA2 in the series-parallel converter 1 to generate a timing comparison clock signal RCLK which drives the shift registers 21 and 23.

When one of the modified frame synchronizing patterns is stored in the shift registers 21 and 23, it is detected by a corresponding modified frame synchronizing pattern detection circuit 22 or 24. The pattern detection circuit 22 and 24 output pattern not detected signals $\overline{COIN1}$ and $\overline{COIN2}$, respectively, which are supplied to timing comparison circuits 31 and 32. A frame pulse output circuit 53 in the frame pulse timing control circuit 5 counts the pulses of the clock signal RCLK from the delay circuit 7, forecasts the time at which all the bits of the frame synchronizing pattern will be stored in the shift registers 21 and 23 and outputs the frame pulse at that time. The timing comparison circuits 31 and 32 discriminate whether the outputs from the detection circuits 22 and 24 indicate detection of one of the modified frame synchronizing patterns when the frame pulse is generated. If there is no detection of one of the modified frame synchronizing patterns, timing comparison circuits 31 and 32 output signals NC1 and NC2 which indicate timing noncoincidence.

The timing noncoincidence signals NC1 and NC2 are supplied to synchronization guarding circuits 41 and 42. These synchronization guarding circuits 41 and 42 count consecutive repeated outputs of the timing noncoincidence signals NC1 and NC2 from the timing comparison circuits 31 and 32. For example, when the timing noncoincidence signals NC1 and NC2 are output four times consecutively, it is discriminated as asynchronization and asynchronization signals SYNC1 and SYNC2 are then output. A phase lock operation discriminating circuit 51 discriminates whether a phase lock operation should be performed on the basis of four conditions: the noncoincidence signals NC1 and NC2 and the asynchronization signals SYNC1 and SYNC2 output from the synchronization guarding circuits 41 and 42. During the phase lock operation, the one-bit shifter 52 is not operated because the clock signal RCLK input from the delay circuit 7 is inhibited for one bit and thus the timing frame pulse generation by the frame pulse generating circuit 53 is delayed for one bit.

In the embodiment illustrated in FIG. 3, the detecting circuit 22 detects the pair of partial frame synchronizing patterns illustrated in FIG. 2B (MODE1) as forming a modified frame synchronizing pattern stored in the shift registers 21 and 23, while the detecting circuit 24 detects the pair of patterns illustrated in FIG. 2C (MODE2). Accordingly, the timing comparison circuit 31 and the synchronization guarding circuit 41 correspond to MODE1, while the timing comparison circuit 32 and the synchronization guarding circuit 42 correspond to MODE2. Therefore, the detecting circuits 22 and 24 and timing comparison circuits 31 and 32 are able to detect the frame synchronizing pattern in either MODE1 or MODE2 despite the change in bit length of the frame synchronizing pattern. Furthermore, the synchronization guarding circuits 41 and 42 provide the same synchronization protection to ODATA as provided where there is no separation of ODATA into separate signal trains. Thus, frame synchronizing processing may be executed without increasing the number of protection stages of the synchronization guarding circuits 41 and 42 and without increase in the time required for frame synchronization (frame synchronization recovery time).

Under the condition that synchronization is established, the timing noncoincidence signal NC1 from the timing comparison circuit 31 and asynchronization discrimination signal SYNC1 are obtained from the synchronization guarding circuit 41 each frame period in MODE1. Similarly, the timing noncoincidence signal NC2 from the timing comparison circuit 32 indicates noncoincidence and signal SYNC2 indicates asynchronization of the modified frame synchronization pattern corresponding to MODE2.

Therefore, the output signals of synchronization guarding circuits 41 and 42 or the timing comparison circuits 31 and 32 may be used as a mode discrimination signal. Accordingly, if the mode is changed, constant channel data may be output to a succeeding demultiplexer (DMUX, not illustrated) by supplying the outputs DATA1 and DATA2 of shift registers 21 and 23 to a switch 8 and then controlling the switch 8 with the signals from the synchronization guarding circuits 41 and 42 or the timing comparison circuits 31 and 32.

Figure 4:
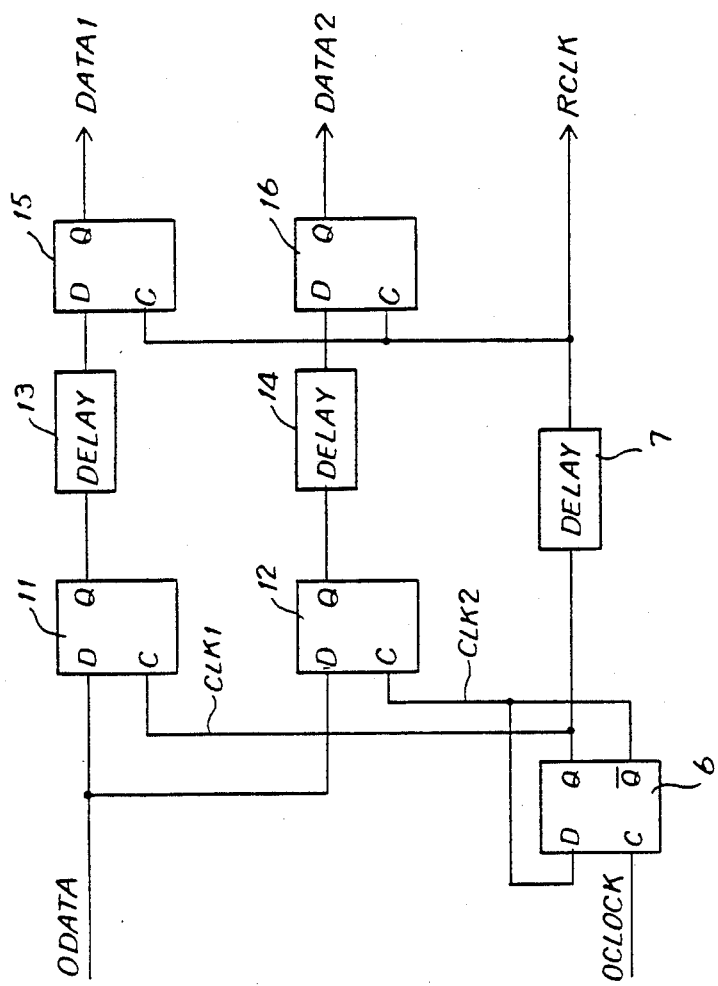
FIG. 4 is a circuit diagram of a preferred embodiment of the series-parallel conversion circuit in FIG. 3.
Figure 5:
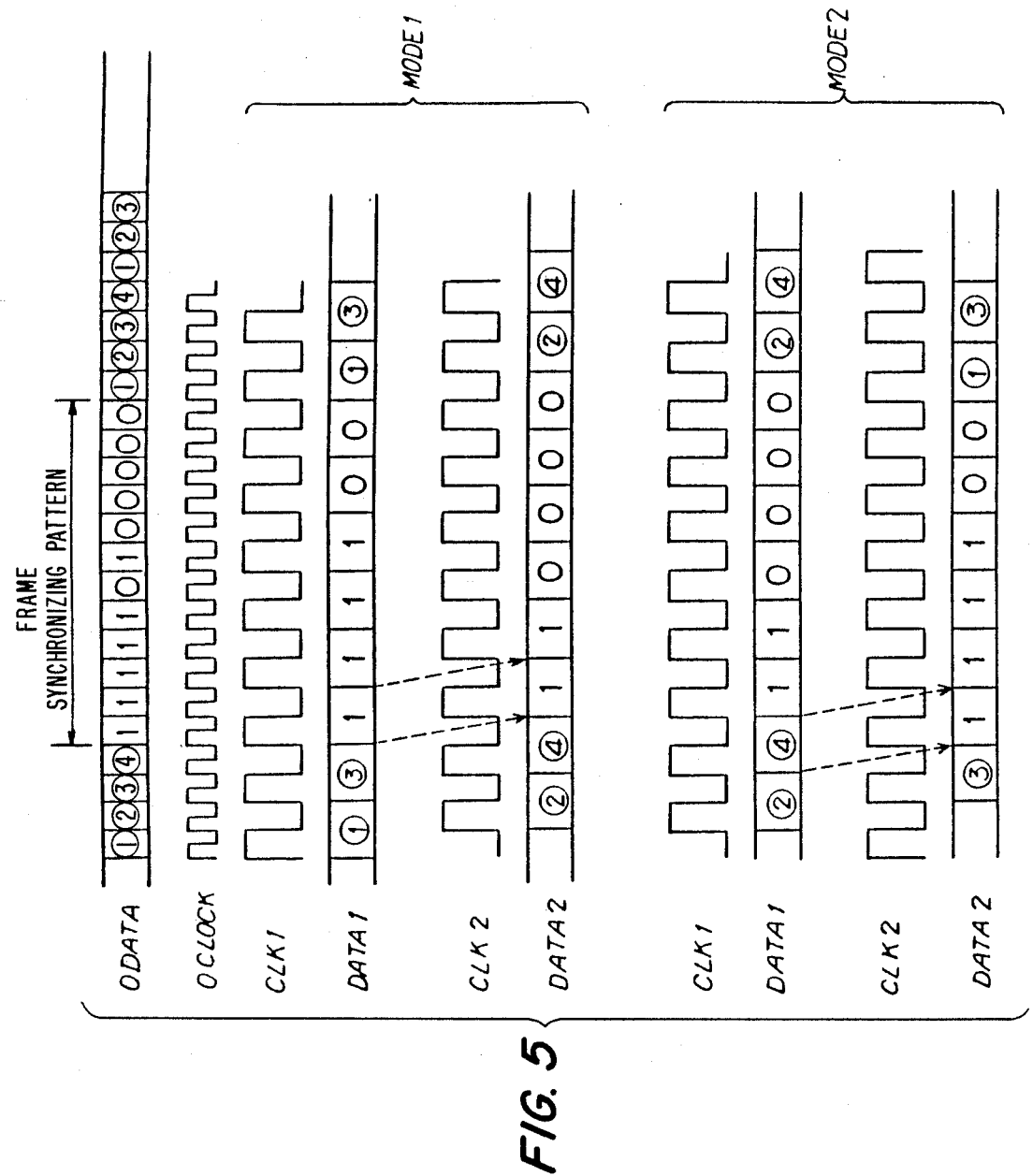
FIG. 5 is a time chart for explaining the operation of the series-parallel conversion circuit illustrated in FIG. 4.

Next, each part of the frame synchronizing circuit of FIG. 3 will be described in detail. FIG. 4 is a circuit diagram of a preferred embodiment of the series-parallel conversion circuit 1 in FIG. 3 and FIG. 5 is a time chart for explaining the operation of FIG. 4. As illustrated in FIG. 4, the input signal ODATA is received by flip-flops 11 and 12, while the clock signal OCLOCK is extracted from the input signal ODATA and divided in frequency by one-half ($\frac{1}{2}$) by flip-flop 6. The Q output of flip-flop 6 provides a first clock signal CLK1, while the $\bar{Q}$ output provides a second clock signal CLK2 by inverting CLK1. The first clock signal CLK1 is used to the operate flip-flop 11, while the second clock signal CLK2 is used to operate flip-flop 12. In MODE1, the first clock signal CLK1 is synchronized with the leading bit of the frame synchronizing pattern in ODATA, as illustrated in FIG. 5. Thus, in MODE1, flip-flops 11 and 12 respectively output the signal trains DATA1 and DATA2.

The phases of the signal trains DATA1 and DATA2 are adjusted by delay circuits 13 and 14 so that the phases (indicated by the arrow marks in FIG. 5) of bits corresponding to DATA1 and DATA2 are in synchronism with each other. In the same way, the first clock signal CLK1 output from the frequency dividing circuit 6 is also phase-adjusted by the delay circuit 7 to produce a timing comparison clock signal RCLK. Finally, flip-flops 15 and 16 synchronize the divided data signals DATA1 and DATA2 to the timing comparison clock signal RCLK.

In MODE2, one bit of the input signal ODATA is missing due to the influence of transmission line and the leading bit of the frame synchronizing pattern in ODATA is synchronized with the second clock signal CLK2 and output in DATA2. Thus, it can be seen that DATA1 in MODE1 corresponds to DATA2 in MODE2. As indicated in FIG. 5, the delay circuits 13 and 14 in the series-parallel conversion circuit 1 adjusts the relative phase of DATA1 and DATA2 so that DATA1 and DATA2 are in phase, but DATA1 precedes DATA2 by one bit. Accordingly, in MODE2 a bit ④ which was received in ODATA immediately preceding the synchronizing pattern is contained in the leading bit of DATA1 when the leading bit of DATA2 contains the first bit of the frame synchronizing pattern.

Figure 6:
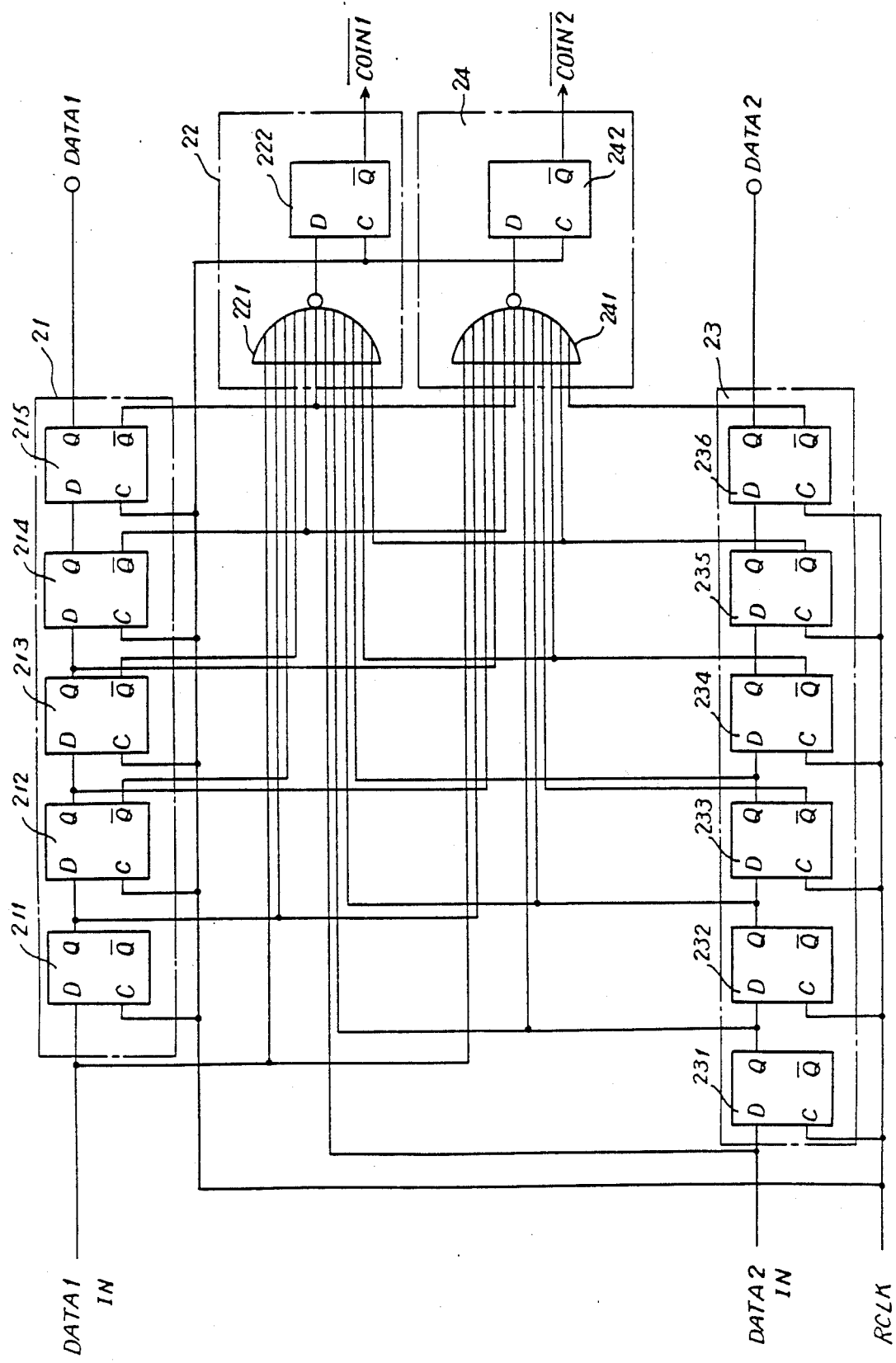
FIG. 6 is a circuit diagram of a preferred embodiment of the frame synchronization pattern detection circuit in FIG. 3.
Figure 7:
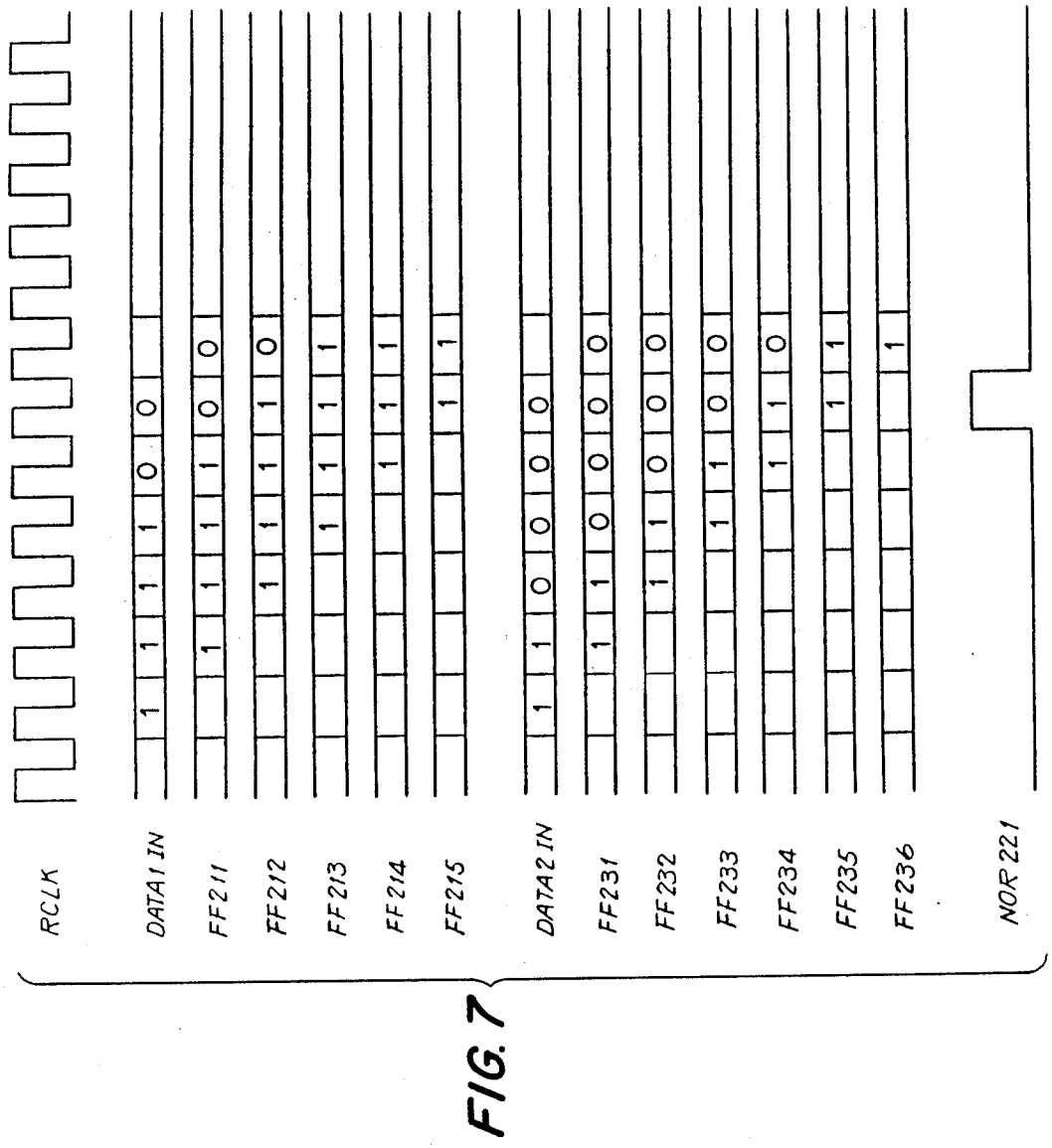
FIGS. 7 and 8 are time charts for explaining the operation of the frame synchronization pattern detecting circuit illustrated in FIG. 6.
Figure 8:
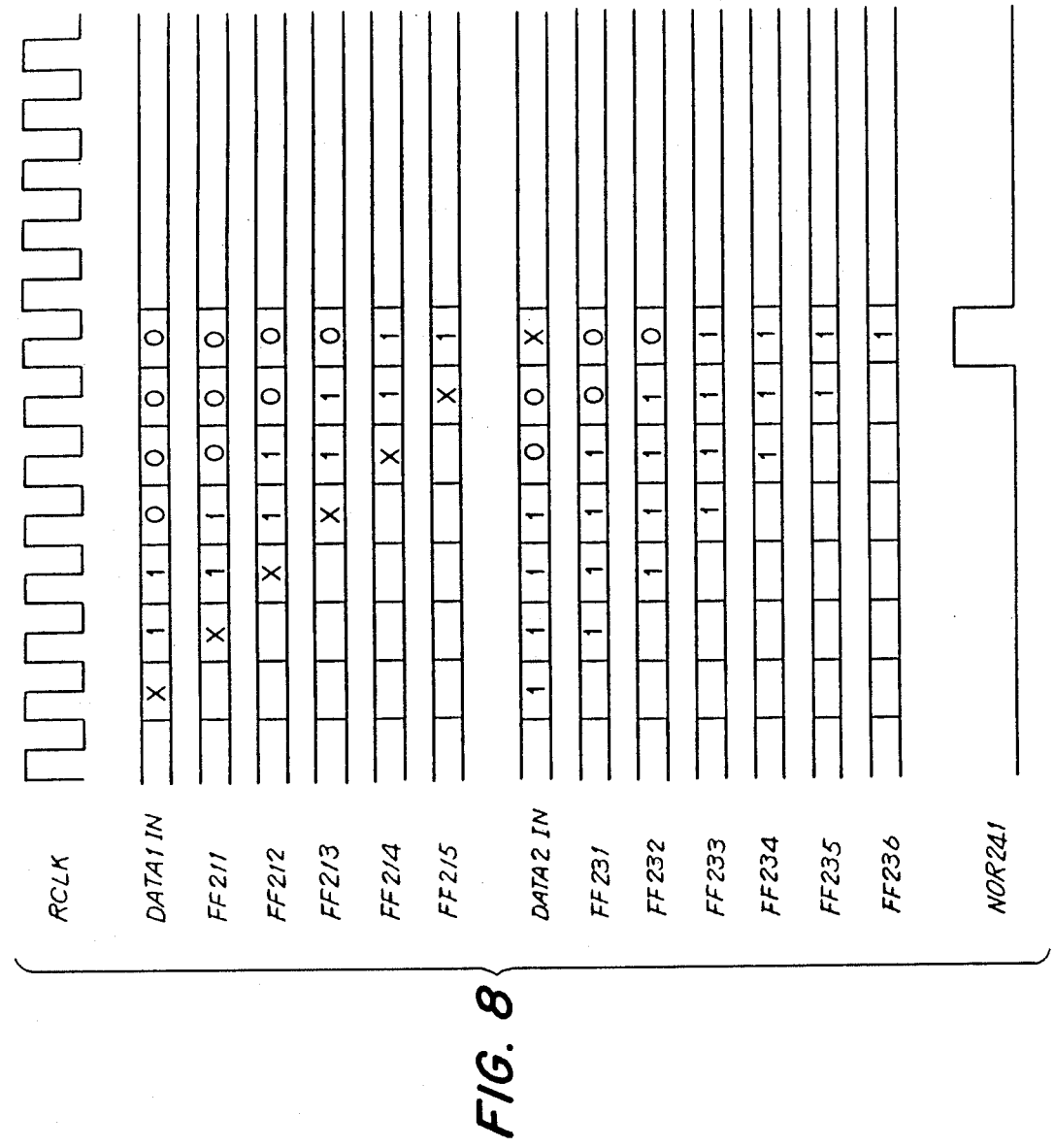

Next, a preferred embodiment of the frame synchronizing pattern detection circuit 2 will be explained with reference to FIGS. 6, 7 and 8. FIG. 6 is a circuit diagram of a preferred embodiment of the frame synchronizing pattern detection circuit 2. FIGS. 7 and 8 are time charts illustrating the operation of the circuit depicted in FIG. 6.

The signal trains DATA1 and DATA2 are in synchronization with RCLK. FIG. 7 corresponds to the situation in MODE1. The outputs of flip-flops 211 through 215 which form the shift register 21 are indicated in FIG. 7 by FF211 through FF215, respectively, and the outputs of flip-flops 231 through 236 which form the shift register 23, are indicated in FIG. 7 by FF231 through FF236, respectively. In MODE1, the frame synchronizing pattern (1111101000000) is detected by a NOR circuit 221 in FIG. 6 as the modified frame synchronizing pattern indicated in FIG. 7. The $\overline{Q}$ output $\overline{COINL1}$ flip-flop 222 accordingly has a high level until the frame synchronizing pattern is detected.

FIG. 8 corresponds to the situation in MODE2. In MODE2, the leading bit of the frame synchronizing is in DATA2. An X is used to indicate the bit ④ precedes the frame synchronizing pattern. As in 7, FF211 through FF215 correspond to the outputs of flip-flops 211 through 215, respectively, while FF231 through FF236 correspond to the outputs of flip-flops 231 through 236. Accordingly, the frame synchronizing pattern is detected by a NOR circuit 241 as the modified frame synchronizing pattern indicated in FIG. 8, and the $\overline{Q}$ output $\overline{COIN2}$ of flip-flop 242 has a high level until the frame synchronizing pattern is detected. The output flip-flops 222 and 242 are driven by the timing comparison clock signal RCLK which also drives the shift registers 21 and 23. Thus, flip-flops 222 and 242 are synchronized to the outputs of NOR circuits 221 and 241 as well as the operations of the shift registers 21 and 23.

As explained previously, the NOR circuits 221 and 241 monitor the signal trains DATA1 and DATA2 in combination for the total bit length of the frame synchronizing pattern. In other words, the reduction in bit length of the frame synchronizing pattern in DATA1 and DATA2 caused by the separation of ODATA into two signal trains has no detrimental effect, because the frame synchronizing pattern is detected for its total bit length in ODATA. Accordingly, the timing comparison circuit 3 and synchronization guarding circuit 4 in the succeeding stages respond to the pattern detected signals $\overline{COIN1}$, $\overline{COIN2}$ which are based on the total bit length of the frame synchronizing pattern.

Figure 9:
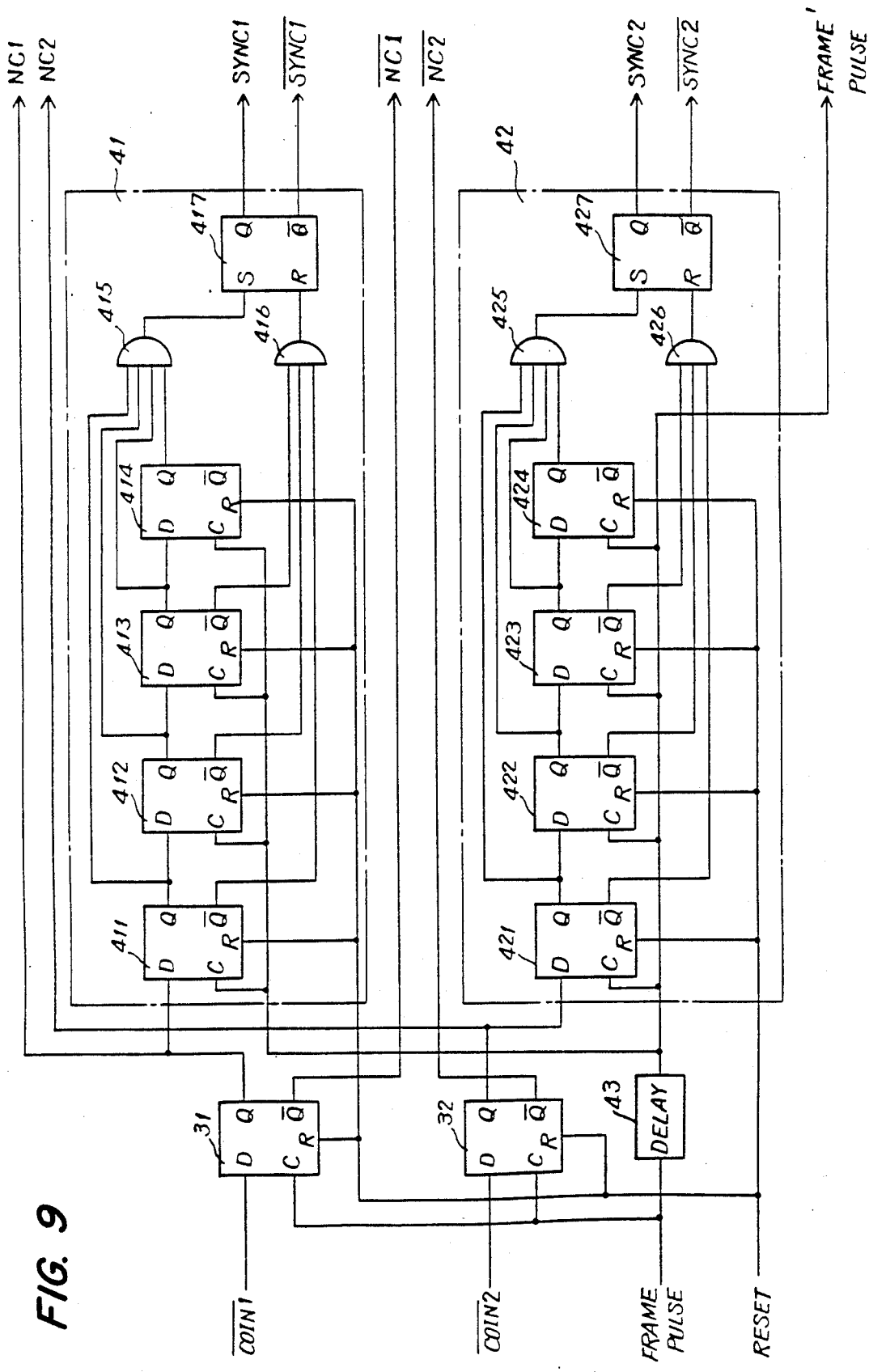
FIG. 9 is a circuit diagram of a preferred embodiment of the synchronization protecting circuit in FIG. 3.

FIG. 9 is a circuit diagram of a preferred embodiment of the timing comparison circuits 31 and 32 and synchronization guarding circuits 41 and 42. FIG. 11 is a circuit diagram of a preferred embodiment of the phase lock operation discrimination circuit 51, one-bit shifter 52 and frame pulse generating circuit 53 and FIG. 10 provides time charts of these circuits.

As illustrated in FIG. 9, the pattern not detected signals $\overline{COIN1}$ and $\overline{COIN2}$ indicating detection of the corresponding modified frame synchronizing pattern with a low level signal, from the outputs of the $\overline{Q}$ terminals of flip-flops 222 and 242, are supplied to the timing comparison circuits 31 and 32.

Figure 10:
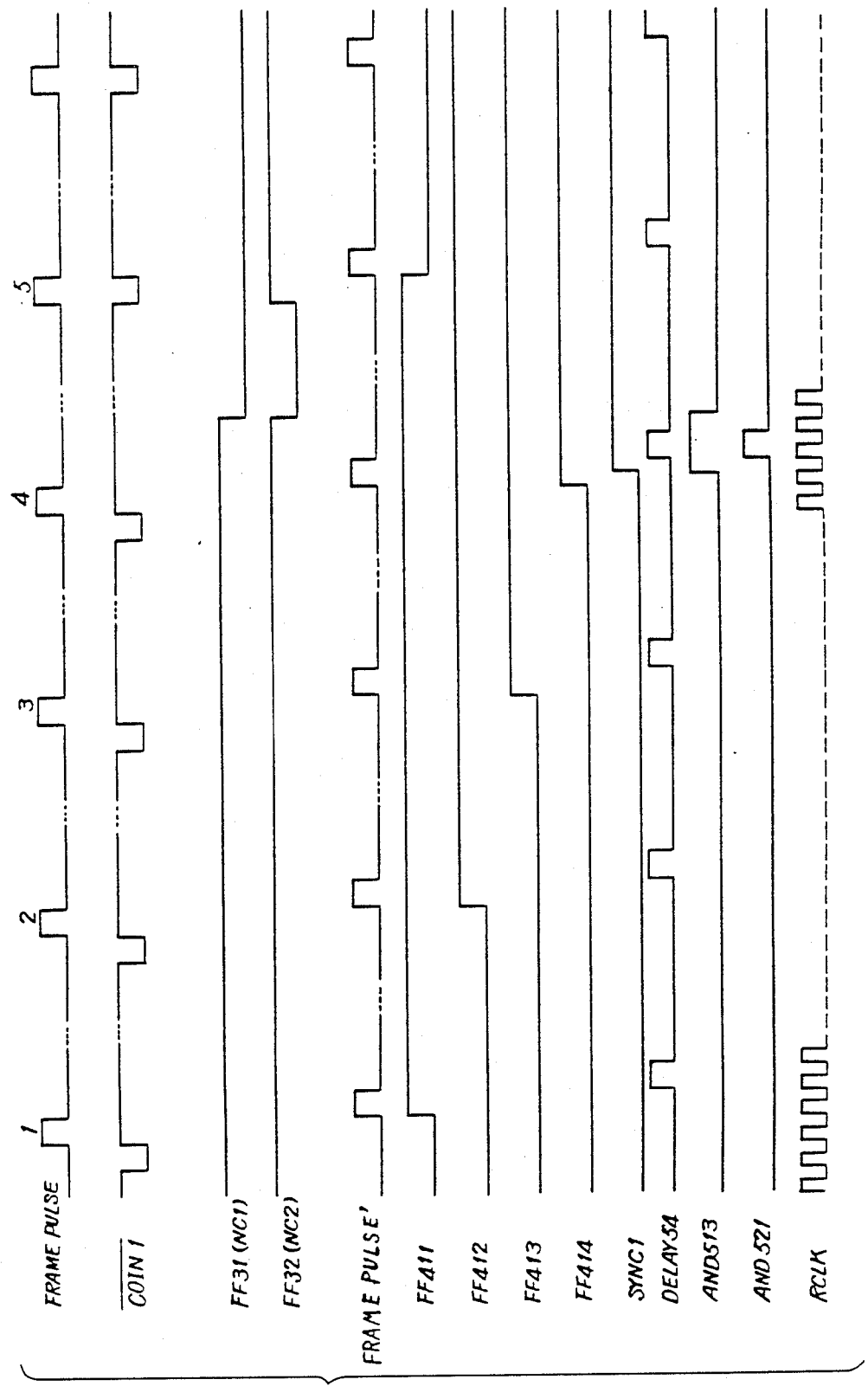
FIG. 10 is a time chart for explaining the operation of the synchronization protecting circuit illustrated in FIG. 9.
Figure 11:
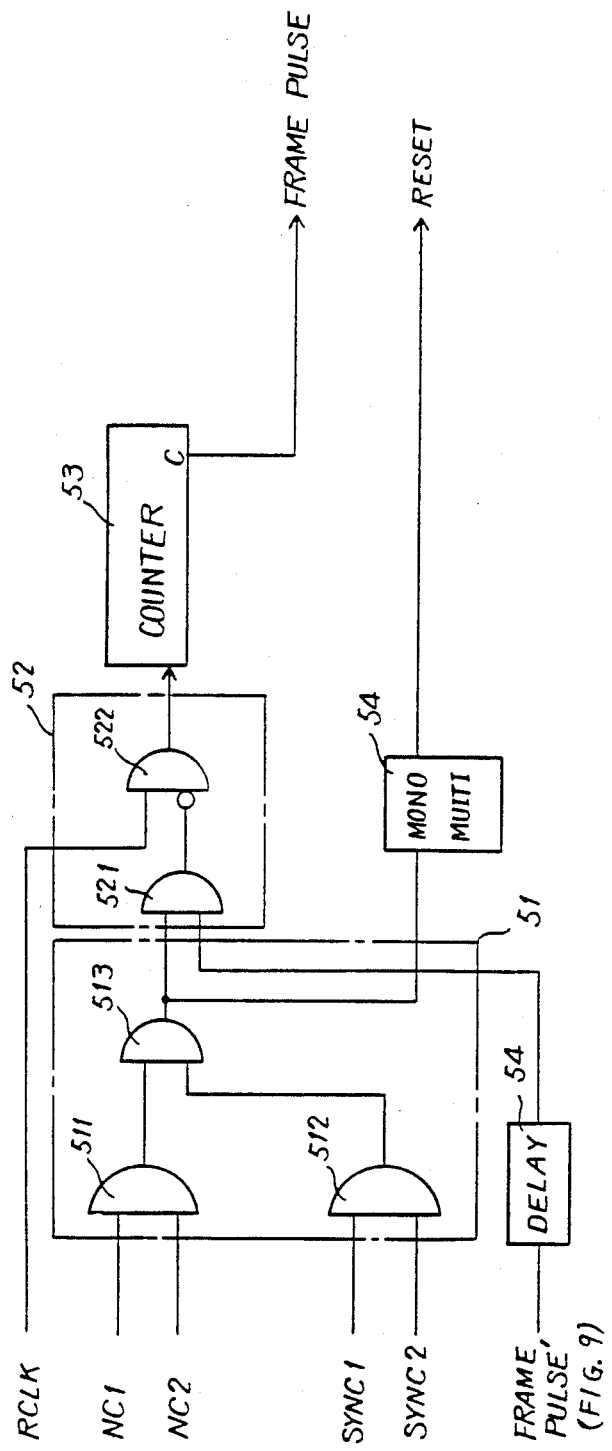
FIG. 11 is a circuit diagram of a preferred embodiment of the frame pulse output and timing control circuits illustrated in FIG. 3.

In the example illustrated in FIG. 10, COIN1 initially indicates existence of the modified frame synchronizing pattern corresponding to MODE1 one bit prior to generation of the frame pulse. As a result, the output NC1 of flip-flop 31 has a high level initially. The timing comparison circuit (flip-flop) 31 operates by using the FRAME PULSE as a clock signal and maintains the condition of COINL1 appearing when a pulse of the signal FRAME PULSE is received until the next pulse appears. Therefore, the circuit 31 always outputs the frame synchronization pattern noncoincidence signal NC1 with a high level when the signal FRAME PULSE has a high level and the pattern not detected signal $\overline{COIN1}$ has a high level indicating that the corresponding modified frame synchronizing pattern is not present in shift registers 21 and 23.

The signal FRAME PULSE output by the frame pulse generator 53 (FIG. 3) is delayed by a delay circuit 43 so a delayed signal FRAME PULSE' is supplied to synchronization guarding circuits 41 and 42. The output NC1 of flip-flop 31 is input to a shift register which forms the synchronization guarding circuit 41. This shift register comprises four cascade connected flip-flops 411, 412, 413 and 414 which are driven by the signal FRAME PULSE output by the delay circuit 43. This delay circuit 43 is provided to ensure that the output of flip-flop 31 indicates comparison of the latest frame pulse with the latest output of the gate circuit 221 when the shift register 41 is clocked.

If the output NC1 of flip-flop 31 is a high level signal, indicating noncoincidence of timing, as illustrated at the left side of FIG. 10 for four consecutive frame pulses, the outputs of flip-flops 411, 412, 413 and 414 are all high level and therefore AND gate 415 opens, setting flip-flop 417 to output the signal SYNC1 which indicates asynchronization. In other words, when the noncoincidence signal NC1 from the timing comparison circuit 31, indicates noncoincidence of timing for four consecutive periods of frame synchronization, frame asynchronization is discriminated and SYNC1 is output with a high level. Similar operations are performed by flip-flop 32 and synchronization guarding circuit 42 for MODE2. Since the output of flip-flop 32 is a high level signal when each FRAME PULSE' is received by the synchronization guarding circuit 42 in the example in FIG. 10, the Q output of flip-flop 427 in the synchronization guarding circuit 42 always indicates asynchronization with a high level of asynchronization signal SYNC2.

The noncoincidence signal NC1 and asynchronization signal SYNC1 for MODE1 and the signals NC1 and SYNC2 for MODE2 are input to the phase lock discrimination circuit 51, as illustrated in FIG. 11. In the phase lock operation discrimination circuit 51, an AND gate 513 turns ON only when both NC1 and NC2 indicate noncoincidence of timing (AND gate 511 is ON) and both SYNC1 and SYNC2 indicate asynchronization (AND gate 512 is ON). As illustrated in FIGS. 10 and 11, the FRAME PULSE' which is output from the delay circuit 43 is further delayed by delay circuit 54 and is then input to AND gate 521 in the one-bit shifter 52 so that SYNC1 and SYNC2 correspond to the same frame pulse as NC1 and NC2. Accordingly, the AND gate 521 supplies the output of AND gate 513 in synchronism with the twice-delayed frame pulse to AND gate 522 of the one-bit shifter 52 for a period of one bit. The timing comparison clock signal RCLK is supplied to the counter 53 which outputs the signal FRAME PULSE when RCLK has been counted for a predetermined number of bits. When the output of AND gate 521 has a high level, application of RCLK to the counter 53 is inhibited by AND gate 522 for one bit. Thus, the frame pulse generation timing is delayed for one bit every time AND gate 513 generates a high level output requesting phase lock operation.

As a result, as shown in FIG. 10, after the AND gate 521 generates a pulse (AND 521), the signal FRAME PULSE coincides with the output timing of the modified frame synchronizing pattern detection signal $\overline{COIN1}$ for MODE1. Thus, the noncoincidence signal NC1 from flip-flop 31 remains at a low level indicating that the timings of the $\overline{COIN1}$ and FRAME PULSE coincide with each other. When this condition does not change for three consecutive frame pulses, the AND gate 416 is turned ON, flip-flop 417 is reset and the asynchronization signal SYNC1 goes to a low level, indicating that synchronization signal is established. In other words, the fact that the asynchronization signal SYNC1 is has a low level indicates that the phase pull-in state was established by the RCLK signal being shifted by one bit.

The output of AND gate 513 which outputs the control signal for shifting the frame pulse by one bit also triggers generation of a reset signal RESET by monostable multivibrator 54. The reset signal resets the flip-flops in the timing comparison circuits 31 and 32 as well as flip-flops 411 through 414 and 421 through 424. The operations of the frame synchronizing circuit 42 are similar if the change in timing caused by the phase-lock control signal output by AND gate 513 results in detection of frame synchronization in MODE2 instead of MODE1 as described above.

Figure 12:
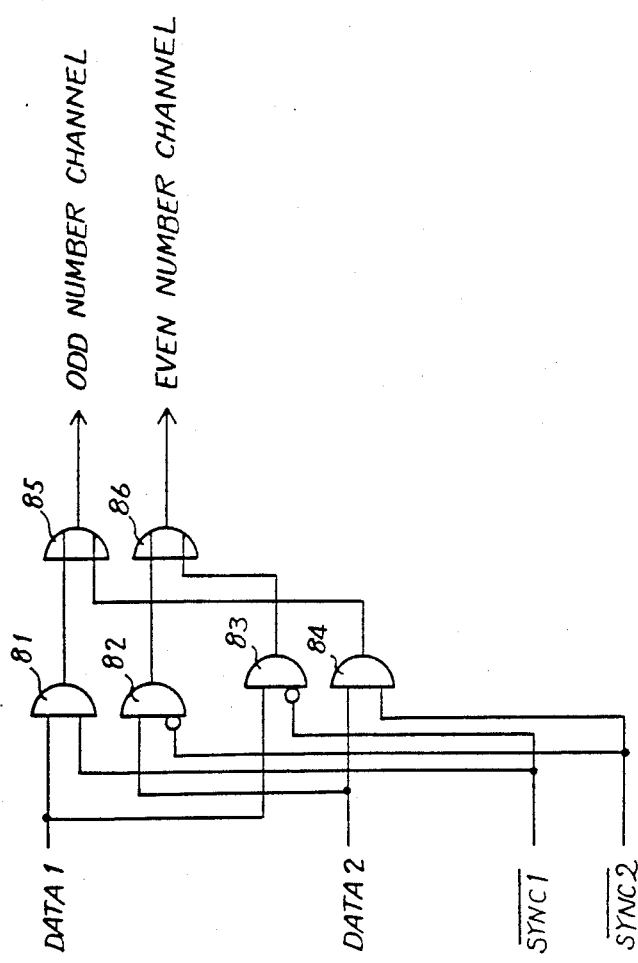
FIG. 12 is a circuit diagram of a preferred embodiment of switch 8 in FIG. 3.

The function of switch 8 will now be described with reference to FIG. 12 which illustrates a preferred embodiment of switch 8. As indicated in FIG. 5, where the input signal ODATA is obtained by dot-multiplexing the signals of four channels represented by 1, 2, 3 and 4, the grouping of the channels in signal trains DATA1 and DATA2 are different in MODE1 and MODE2. As indicated in FIGS. 3 and 6, the Q output of flip-flops 215 and 236 in the final stages of the shift registers 21 and 23 are supplied as DATA1 and DATA2, respectively, to a demultiplexer DMUX (not shown) via switch 8. The DMUX requires that the data be supplied consistently to its inputs. Therefore, switch 8 is provided to change the output destination of the signal trains DATA1 and DATA2 by discriminating whether data is received in MODE1 or MODE2. As described previously, when frame synchronization is established, the signals SYNC1 and SYNC2 from the synchronization guarding circuits 41 and 42 can be used as mode discrimination signals. Namely, in MODE1, NC1 has a low level if COIN1 coincides with the timing of FRAME PULSE. Similarly, NC2 has the low level and COIN2 coincides with the timing of FRAME PULSE in MODE2. Accordingly, the Q outputs (SYNC1 and SYNC2) of 417 and 427 or the Q outputs (NC1 and NC2) of the timing comparison circuits 31 and 32 in FIG. 9 may be directly used as mode discrimination signal. Namely, as illustrated in FIG. 12, when $\overline{SYNC1}$ (or $\overline{NC1}$) a high level (MODE1), DATA1 is output from gates 81 and 85 and DATA2 is output from gates 82 and 86. On the other hand, when (or $\overline{NC2}$) has a high level (MODE2), DATA2 is output from gates 84 and 85 and DATA1 is output from the gates 83 and 86. As a result, the bits corresponding to odd data channels in FIG. 5 are always routed through the OR gate 85 to the odd number output channel while the bits of even data channels are routed through the OR gate 86 to the even number output channel. Use of $\overline{SYNC1}$ and $\overline{CYNC2}$, as illustrated, rather than $\overline{NC1}$ and $\overline{NC2}$ ensures that switch 8 changes the routing of DATA1 and DATA2 only after the synchronization guarding circuits 41 and 42 have verified the occurrence of repeated coincidence of one of the modified frame synchronizing patterns and the frame pulse.

Figure 13:
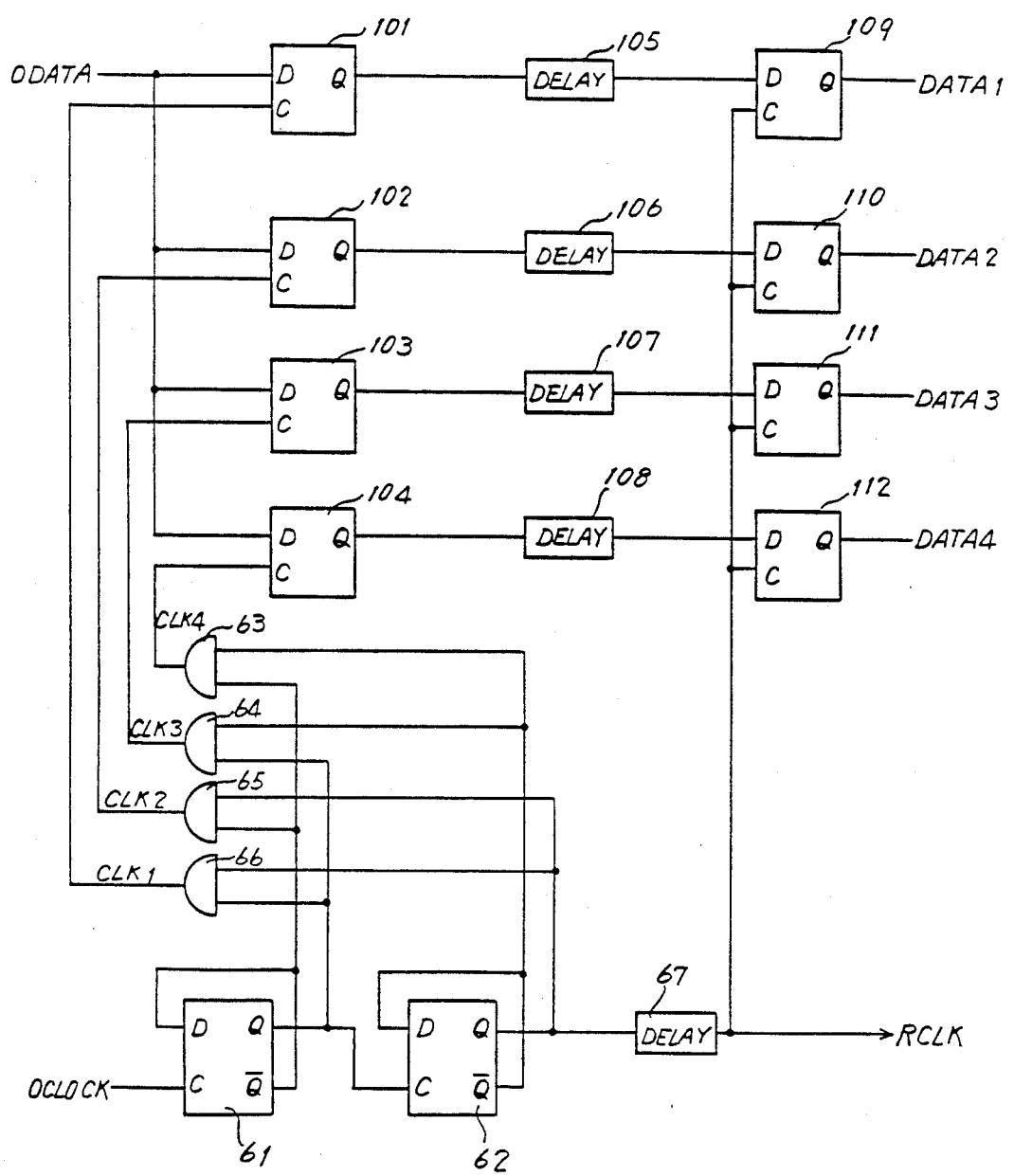
FIG. 13 is a circuit diagram of a preferred embodiment of a series-parallel conversion circuit for separation of the input signal into four signal trains.
Figure 14:
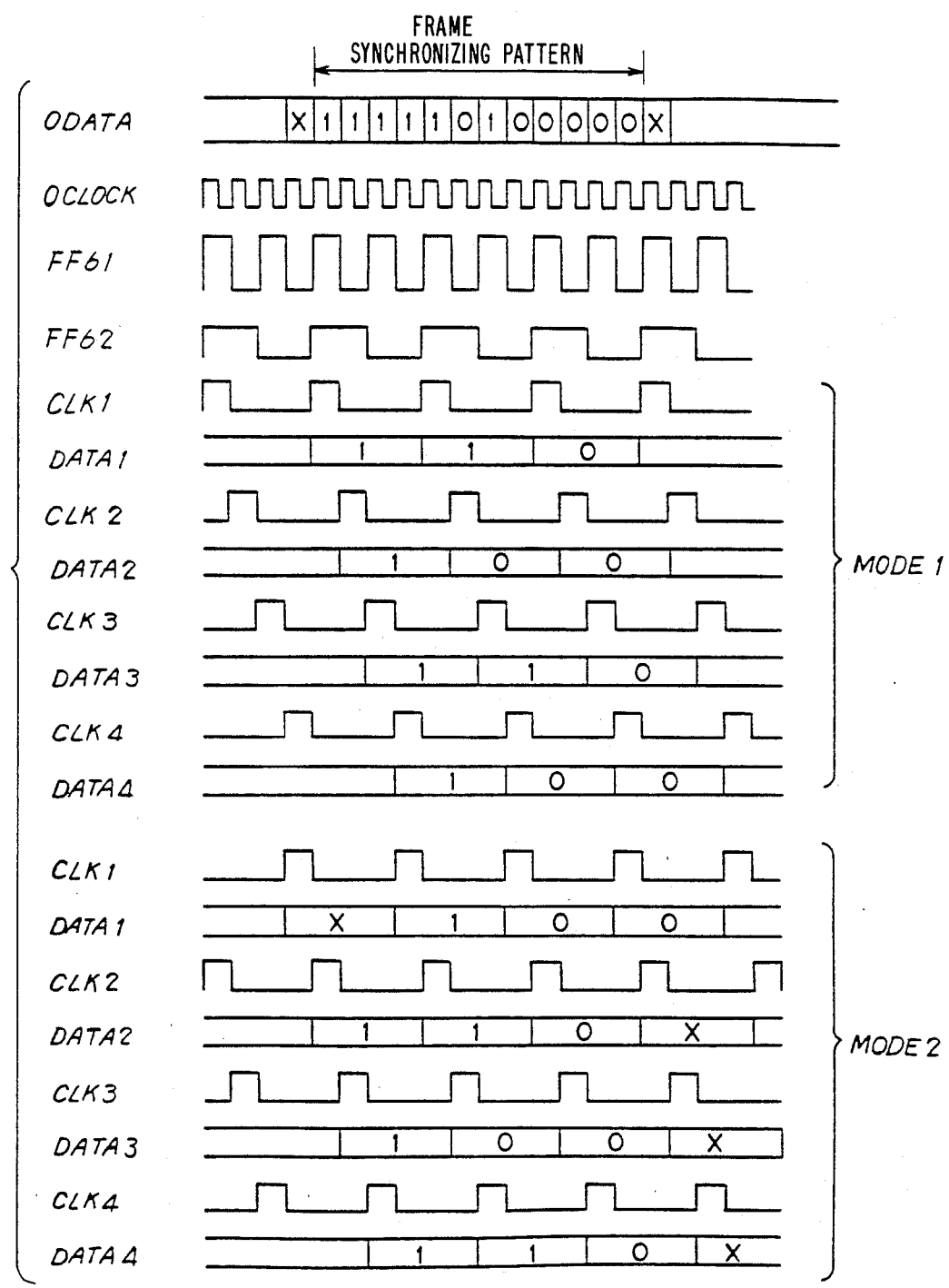
FIG. 14 is a time chart for explaining the operation of the series-parallel conversion circuit illustrated in FIG. 13.

In the above described embodiment, the ODATA was separated into two signal trains DATA1 and DATA2. Now, separation into four signal trains will be described. FIG. 13 is a logical circuit diagram of a preferred embodiment of the series-parallel conversion circuit 1 for separating the input signal ODATA into four signal trains of DATA1 through DATA4. FIG. 14 is a time chart for the circuit illustrated in FIG. 13. When ODATA is separated into four signal trains, there are four modes, as indicated in FIGS. 2D–2G. However, FIG. 14 illustrates only two of the modes, MODE1 corresponding to FIG. 2D and MODE2 corresponding to FIG. 2E. The remaining modes, MODE3 and MODE4, corresponding to FIGS. 2F and 2G, respectively, are omitted here. The clock signal OCLOCK is divided in frequency into a one-half clock signal FF61 by flip-flop 61 and further divided into a one-quarter clock signal FF62 by flip-flop 62. The one-half and one-quarter clock signals FF61 and FF62 are combined by AND gates 63–66 to produce outputs CLK1, CLK2, CLK3 and CLK4 having a one-quarter clock period and the pulse width of a one-half clock signal.

The input signal ODATA is sent bit by bit to flip-flops 101, 102, 103 and 104 in its input sequence and converted to four signal trains in synchronism with the signals CLK1–CLK4. Delay circuits 105, 106, 107 and 108 synchronize DATA1 through DATA4 to the timing comparison clock signal RCLK which is output from delay circuit 67. As described above, in MODE1 the leading bit is the frame synchronizing pattern exists in signal train DATA1, while in MODE2, the leading bit is DATA2, in MODE3 the leading bit is in the DATA3 and in MODE4 the leading bit is in DATA4. In other words, four modified frame synchronizing patterns are generated as indicated in FIGS. 2D–2G.

Figure 15:
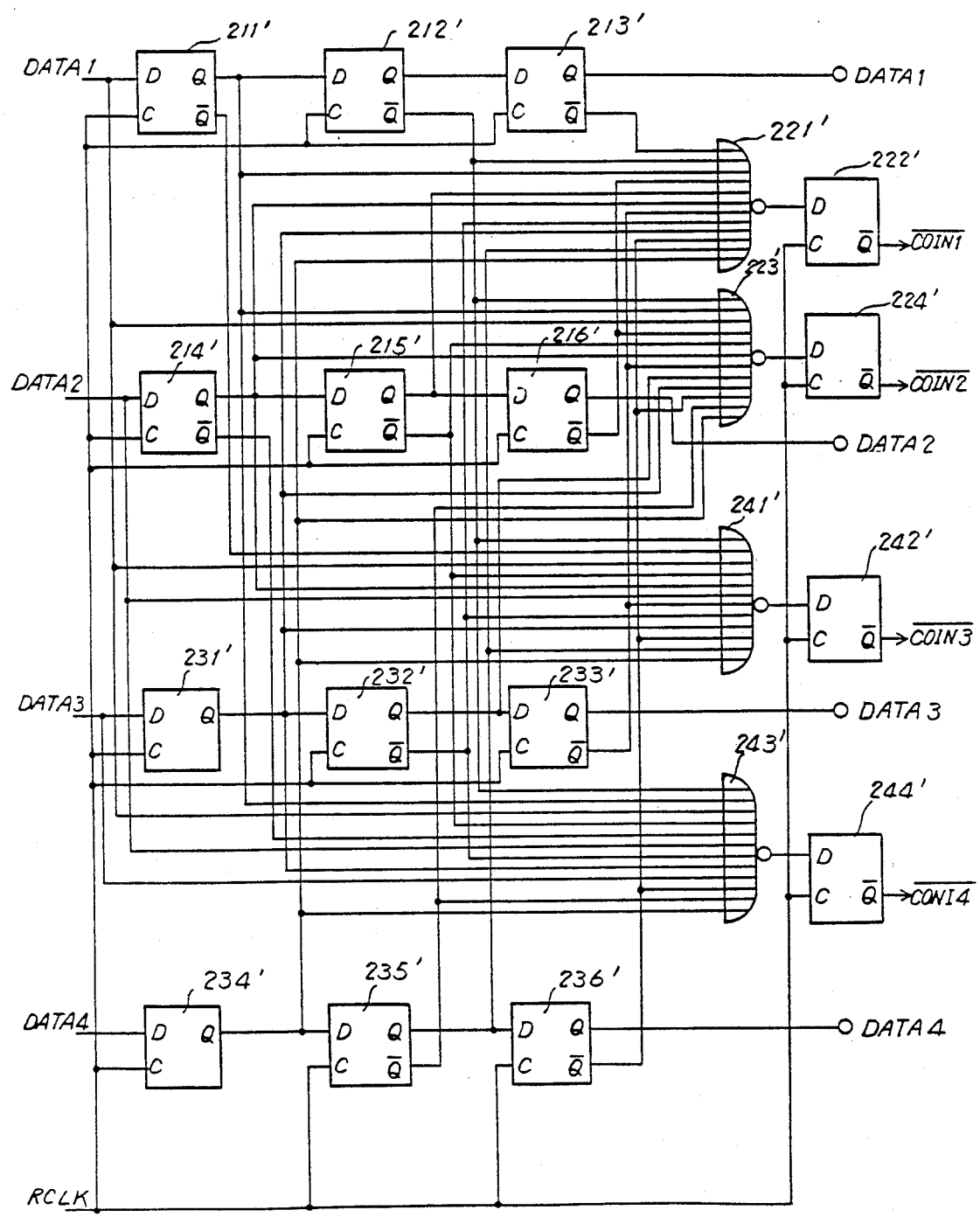
FIG. 15 is a circuit diagram of a preferred embodiment of a frame synchronizing pattern detection circuit for four signal trains.

FIG. 15 is a circuit diagram of a preferred embodiment of a frame synchronizing pattern detection circuit for detecting the four modified frame synchronizing patterns illustrated in FIGS. 2D–2G. The four signal trains DATA1, DATA2, DATA3 and DATA4 are respectively input to three-stage shift registers from the series-parallel conversion circuit illustrated in FIG. 13. In this embodiment, a frame synchronizing pattern of twelve bits is used as an example. Therefore, four parallel three-stage shift registers are sufficient to define the frame synchronizing pattern of twelve bits.

NOR circuit 221' detects the frame synchronizing pattern in MODE1 which is depicted by FIG. 2D, while NOR circuit 223' detects the frame synchronizing pattern in MODE2 depicted by FIG. 2F, NOR circuit 241' detects the frame synchronizing pattern in MODE3 depicted by FIG. 2F and NOR circuit 243' detects the frame synchronizing pattern in MODE4 depicted by FIG. 2G. Flip-flop 222' outputs the frame synchronizing pattern detection signal of MODE1, while flip-flops 224', 242' and 244' output the frame synchronizing pattern detection signals $\overline{COIN2}$, $\overline{COIN3}$ and COIN4 of MODE2, MODE3 and MODE4, respectively.

Corresponding to the signals $\overline{COIN1}$ through $\overline{COIN4}$, four timing comparison circuits and synchronization guarding circuits are respectively provided. The structures of these circuits are the same as those of the timing comparison circuits 31 and 32 and synchronization guarding circuits 41 and 42 in FIG. 9 and thus, explanation of their structure is omitted here.

The many features and advantages of the present invention are apparent in the detailed specification, and thus, it is intended by the appended claims to cover all such features and advantages of the circuit which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope and spirit of the invention.

What is claimed is:

1. A frame synchronizing circuit, comprising:

signal separation means for separating an input signal, having a frame synchronizing pattern periodically inserted therein, into a predetermined number of signal trains;

frame synchronizing pattern detection means for detecting modified frame synchronizing patterns in the signal trains;

frame pulse output means for outputting a frame pulse with a timing corresponding to the period of the frame synchronizing pattern in the input signal;

timing comparison means for producing a noncoincidence signal indicating noncoincidence of the frame pulse and each of the modified frame synchronizing patterns;

synchronization guarding means for discriminating whether the frame pulse is synchronized with one of the modified frame synchronizing patterns; and timing control means for adjusting the timing of the frame pulse when said timing comparison means detects noncoincidence and said synchronization guarding circuit indicates asynchronization of all of the modified frame synchronizing patterns.

2. A frame synchronizing circuit as recited in claim 1, wherein said frame synchronizing pattern detection means detects the predetermined number of modified frame synchronizing patterns and comprises modified frame pattern detection circuits, operatively connected to said signal separation means, said frame pulse output means and said timing comparison means, each of said modified frame synchronizing pattern detection circuits detecting one of the modified frame synchronizing patterns, wherein said timing comparison means comprises timing comparison circuits, each of said timing comparison circuits operatively connected to a corresponding modified frame synchronizing pattern detection circuit, said frame pulse output means and said synchronization guarding means, for generating a noncoincidence signal indicating noncoincidence of the frame pulse with the modified frame synchronizing pattern detected by the corresponding modified frame synchronizing pattern detection circuit, and wherein said synchronization guarding means comprises synchronization guarding circuits, each of said synchronization guarding circuits operatively connected to a corresponding timing comparison circuit, said frame pulse output means and said timing control means, for producing a synchronization signal indicating synchronization of one of the modified frame synchronizing patterns with the frame pulse in dependence upon the noncoincidence signal output by the corresponding timing comparison circuit.

3. A frame synchronizing circuit as recited in claim 2, wherein said signal separation means separates the frame synchronizing pattern into partial frame synchronizing patterns in the signal trains, respectively, and wherein each of said modified frame synchronizing pattern detection circuits monitors all of the signal trains and combines all of the partial frame synchronizing patterns in detecting the modified frame synchronizing pattern corresponding thereto.

4. A frame synchronizing circuit as recited in claim 2, wherein the input signal comprises a plurality of multiplexed data channels, and wherein said frame synchronizing circuit further comprises switching means for discriminating which of the modified frame synchronizing patterns is in synchronization in dependence upon the noncoincidence and synchronization signals output by said timing comparison circuits and said synchronization guarding circuits, respectively, and for assigning the signal trains to output channels having an unvarying correspondence to the data channels.

5. A frame synchronizing circuit as recited in claim 2, further comprising clock signal generation means for generating a clock signal in phase with each of the signal trains in dependence upon the input signal, wherein said frame pulse output means comprises a counter, operatively connected to said clock signal generating means, said timing control means and said timing comparison circuits, for counting the clock signals under control of said timing control means and outputting the frame pulse every time a maximum count is reached, and wherein said timing control circuit comprises a phase lock circuit for generating a timing adjustment signal in dependence upon the noncoincidence and synchronization signals output by said timing comparison circuits and said synchronization guarding circuits, respectively, the timing adjustment signal inhibiting a single pulse of the clock signal from being applied to said counter.

6. A frame synchronizing circuit as recited in claim 2, wherein said frame synchronizing pattern detection means further comprises shift registers, each operatively connected to said signal separation means and all of said modified frame synchronizing pattern detection circuits, for shifting a corresponding one of the signal trains, and wherein each of said modified frame synchronizing pattern detection circuits comprises a gate circuit, operatively connected to selected portions of said shift registers for detecting of all bits of a corresponding one of the modified frame synchronizing patterns.

7. A frame synchronizing circuit, comprising:

a series-parallel conversion circuit, operatively connected to receive a serial signal containing multiplexed channels and a frame synchronizing pattern inserted periodically therein, for separating the serial signal into a predetermined number of signal trains having bits, shift registers, operatively connected to said series-parallel conversion circuit, each of said shift registers receiving one of the signal trains;

gate circuits, each of said gate circuits operatively connected to all of said shift registers, for selectively combining the bits of the signal trains stored in said shift registers to detect a corresponding one of the predetermined number of modified frame synchronizing patterns;

clock signal generating means for generating a clock signal in phase with the signal trains from the serial signal;

a frame pulse generating circuit for counting pulses in the clock signal and for producing a frame pulse in synchronism with the period of the frame synchronizing pattern;

timing comparison circuits, each of said timing comparison circuits operatively connected to a corresponding one of said modified frame synchronizing pattern detection circuits, said clock signal generating means and said frame pulse generating circuit, for producing a noncoincidence signal indicating noncoincidence of the frame pulse and the detecting of the corresponding modified frame synchronizing pattern by the corresponding gate circuit;

synchronization guarding circuits, each of said synchronization guarding circuits operatively connected to a corresponding one of said timing comparison circuits and said frame pulse generating circuit, for producing an asynchronization signal indicating asynchronization of the corresponding modified frame synchronizing pattern in dependence upon consecutive repeated output of the noncoincidence signal by the corresponding timing comparison circuit; and a phase lock operation discrimination circuit, operatively connected to said frame pulse generating circuit, said clock signal generating means and all of said timing comparison circuits and said synchronization guarding circuits, for inhibiting a single pulse of the clock signal in dependence upon the noncoincidence and asynchronization signals output by said timing comparison circuits and said synchronization guarding circuits.

* * * * *

UNITED STATES PATENT AND TRADEMARK OFFICE
CERTIFICATE OF CORRECTION

PATENT NO. : 4,748,623
DATED : May 31, 1988
INVENTOR(S) : Naonobu FUJIMOTO

It is certified that error appears in the above-identified patent and that said Letters Patent is hereby corrected as shown below:

Column 6, line 23, delete "the" (first occurrence).

Column 7, line 60, "COINL1" should be --$\overline{COIN1}$--.

Column 9, line 5, delete "is";

line 46, "signal." should be --signals.--;

line 49, after "when" insert --$\overline{SYNC2}$--;

line 56, "of $\overline{SYNC1}$ and $\overline{CYNC2}$," should be --of $\overline{SYNC1}$ and $\overline{SYNC2}$,--.

Column 10, line 50, after "signal" insert --$\overline{COIN1}$--;

line 53, "COIN4" should be --$\overline{COIN4}$--.

Signed and Sealed this

Fourth Day of October, 1988

*Attest:*

DONALD J. QUIGG

*Attesting Officer*   *Commissioner of Patents and Trademarks*